United States Patent
Baumann

(10) Patent No.: US 9,828,102 B2
(45) Date of Patent: Nov. 28, 2017

(54) SEAT FIXING DEVICE FOR FIXING A VEHICLE SEAT, AND VEHICLE SEAT COMPRISING SUCH A SEAT FIXING DEVICE

(75) Inventor: Jürgen Baumann, Deutschland (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 546 days.

(21) Appl. No.: 13/817,871

(22) PCT Filed: Aug. 23, 2011

(86) PCT No.: PCT/EP2011/004223
§ 371 (c)(1),
(2), (4) Date: Mar. 19, 2013

(87) PCT Pub. No.: WO2012/028269
PCT Pub. Date: Mar. 8, 2012

(65) Prior Publication Data
US 2013/0168529 A1 Jul. 4, 2013

(30) Foreign Application Priority Data
Sep. 1, 2010 (DE) .................. 10 2010 036 091

(51) Int. Cl.
*F16M 13/00* (2006.01)
*B64D 11/06* (2006.01)
(Continued)

(52) U.S. Cl.
CPC ...... *B64D 11/0696* (2013.01); *B60N 2/01575* (2013.01); *B60N 2/42709* (2013.01);
(Continued)

(58) Field of Classification Search
CPC .... B60N 2/085; B60N 2/0818; B60N 2/0705; B64D 11/0696
(Continued)

(56) References Cited

U.S. PATENT DOCUMENTS 4,047,689 A * 9/1977 Grendahl ...................... 410/105
4,062,298 A * 12/1977 Weik ............................. 410/105
(Continued)

FOREIGN PATENT DOCUMENTS

DE 19851392 A1 10/1997
DE 102004020931 A1 11/2005
(Continued)

OTHER PUBLICATIONS

German Search Report issued from the German Patent Office dated Jun. 8, 2011 for the corresponding DE patent application No. 10 2010 036 0910 (and partial English translation).
(Continued)

*Primary Examiner* — Kimberly Wood
(74) *Attorney, Agent, or Firm* — Posz Law Group, PLC

(57) ABSTRACT

A seat fixing device for fixing a vehicle seat, in particular an aircraft passenger seat, to at least one fixing rail that is attached to a vehicle structure, comprising a fixing means that is to be coupled to the at least one fixing rail, and comprising a force transmitting unit that is used in a normal olperating mode to provide a first force application path of a weight and acceleration force that is introduced into the vehicle structure via the vehicle seat. The force transmitting unit has a transmitting means that is used in an impact mode to at least initiate a generation of at least one second force application path of the weight and acceleration force that is introduced into the vehicle structure via the vehicle seat.

15 Claims, 3 Drawing Sheets

(51) Int. Cl.
  *B60N 2/015* (2006.01)
  *B60N 2/427* (2006.01)
(52) U.S. Cl.
  CPC ...... *B64D 11/0619* (2014.12); *B60N 2205/20* (2013.01); *Y02T 50/46* (2013.01)
(58) Field of Classification Search
  USPC ..... 248/424, 429, 419, 423, 430; 297/344.1; 296/65.13; 244/118.1, 118.6, 122 R
  See application file for complete search history.

(56) References Cited

U.S. PATENT DOCUMENTS

| | | | |
|---|---|---|---|
| 4,493,470 A * | 1/1985 | Engel | 248/503.1 |
| 5,871,318 A | 2/1999 | Dixon et al. | |
| 7,938,607 B2 * | 5/2011 | Wang | F16B 5/0208 411/107 |
| 2003/0263164 | 11/2006 | Dowty et al. | |
| 2008/0149764 A1 | 6/2008 | Frey | |
| 2009/0243327 A1 * | 10/2009 | Koga | B60N 2/067 296/65.15 |

FOREIGN PATENT DOCUMENTS

| | | |
|---|---|---|
| DE | 102004047455 A1 | 4/2006 |
| DE | 102004055011 A1 | 5/2006 |
| EP | 1794052 B1 | 8/2005 |
| EP | 1657134 B1 | 4/2008 |

OTHER PUBLICATIONS

International Search Report issued from the PCT Patent Office dated Aug. 23, 2011 for the corresponding PCT/EP2011/004223.
Written Opinion issued from the PCT Patent Office dated Dec. 6, 2011 for the corresponding PCT/EP2011/004223 (with partial English translation).
International Preliminary Report on Patentability and Written Opinion of the International Searching Authority dated Mar. 14, 2013 (English translation only).
Office Action dated Jun. 8, 2016 issued in corresponding EP patent application No. 11 755 265.3 (and partial English translation).

* cited by examiner

SEAT FIXING DEVICE FOR FIXING A VEHICLE SEAT, AND VEHICLE SEAT COMPRISING SUCH A SEAT FIXING DEVICE

CROSS REFERENCE TO RELATED APPLICATION

This application is a U.S. national stage application of PCT/EP2011/004223 filed on Aug. 23, 2011, and claims priority to, and incorporates by reference, German Patent Application No, 10 2010 036 091.0 filed on Sep. 1, 2010.

TECHNICAL FIELD

The invention relates to a seat fixing device for fixing a vehicle seat, in particular an aircraft passenger seat, to at least one fixing rail attached to a vehicle structure.

BACKGROUND

EP 1 794 052 A1 discloses such a seat fixing device. This has a fixing means which in a locked state creates a clamp connection with a profile flank of a fixing rail integrated in a cabin floor, and an activation unit.

In the case of an impact event, in vehicles intended for transport of passengers and equipped to this end with vehicle seats, it is of particular importance to retain the integrity of the components used. This requirement is often contradictory to the objective of a minimum unladen weight of the vehicle.

SUMMARY

The present invention is based in particular on the object of providing a solution for a seat fixing device by means of which the strength requirements imposed by safety regulations on mechanical structures used, are reduced so that these structures can be designed to be simple, economical and weight-saving.

This object is achieved by a seat fixing device and by a vehicle seat with such a seat fixing device as disclosed herein. Further advantageous refinements of the invention are given herein.

The invention is based on a seat fixing device for fixing a vehicle seat, in particular an aircraft passenger seat, to at least one fixing rail attached to the vehicle structure, which device comprises a fixing means which is provided for coupling with the at least one fixing rail, and a force transmission unit which is intended to provide, in a normal operating mode, a first force application path of a weight and acceleration force which is introduced into the vehicle structure via the vehicle seat.

The term "force transmission unit" in this context means in particular a serial arrangement of construction elements in which a force acting on one end of the serial arrangement is transmitted up to the other end of the serial arrangement. The term "normal operating mode" of the seat fixing device in this context means in particular an operating mode in which the weight and acceleration force to be introduced into the vehicle structure is lower than a specified and predefined maximum value, and all elements of the seat fixing device have their nominal function and material properties. The term "vehicle structure" in this context means in particular all structural carrier elements of the vehicle which are intended to receive weight and acceleration forces of the vehicle and its contents. The term "acceleration force" in this context means in particular a force provoked due to mass inertia of a mass and an accelerated movement of the mass, wherein the accelerated movement in particular can also be a negative acceleration in the form of braking.

It is proposed that the force transmission unit comprises a transmission means which is intended to at least initiate, in an impact mode, the generation, of at least one second force application path of the weight and acceleration force which is introduced into the vehicle structure via the vehicle seat.

The term "impact mode" of the seat fixing device in this context means in particular an operating mode in which the weight and acceleration force to be introduced into the vehicle structure exceeds a specified and predefined maximum value. The impact mode can for example be caused as a result of acceleration or inertia forces occurring on an impact event in a vehicle in which the seat fixing device is installed. The impact events and corresponding test procedures described in standardized form for the different vehicle types are well known to a person skilled in the art. The term "initiate" in this context means in particular that a precondition is created for the occurrence of the initiated event.

With a corresponding design, mechanical overload occurring because of the impact event can be absorbed by existing, mechanically stable components, so that a mechanical load on devices which contribute to increasing the seating comfort of a seat user, such as for example anti-rattle devices or devices for vibration damping, are advantageously avoided and only low mechanical strength requirements need be imposed on these devices, whereby despite fulfilling all safety requirements, costs, material and weight can be saved.

In an advantageous embodiment it is proposed that the transmission means initiates the generation of the second force application path of the weight and acceleration force which is introduced into the vehicle structure via the vehicle seat, by mechanical deformation. Thus by taking into account substance-specific strength values and by design, the absorption of mechanical overload from an impact event by mechanically stable components can be achieved in a particularly well-defined form.

If the deformation of the transmission means to initiate the generation of the second force application path is of a substantially linear-elastic nature, then advantageously, in the case of occurrence of a slight mechanical overload from the impact event, a reversible deformation can be achieved so that after an end of the impact mode, advantageously the normal operating mode of the seat fixing device can be resumed. The term "of a linear-elastic nature" in this context means in particular that the deformation follows Hooke's law. The term "substantially linear-elastic" in this context means that a deviation from linearity is less than 10%, preferably less than 5%. For example the transmission means can be made of an elastomer material, whereby in the case of the impact event, material ruptures and an associated uneven deformation of the transmission means, and consequently an uneven force application, can be avoided.

It is furthermore proposed that the fixing means has at least one carrier element which is provided, in impact mode, to be carried by an accelerated part of the vehicle seat. Thus by suitable design, after initiation by the transmission means, a particularly simple solution for generating the second force application path can be provided.

If the carrier element has a dimension in a direction transverse to a main extension direction of the fixing means which is greater than the dimensions, measured in this direction, of parts of the fixing means which are arranged before or after the carrier element in the main extension direction, a simple and economical solution for a carrier element can be provided. For example the fixing means can then have a cylinder symmetry with substantially circular cross-section and a diameter varying in the main extension direction, wherein, the carrier element is formed by a part region of the fixing means which is cohesive in the main extension direction and has a greater diameter than in the main extension direction at the regions adjacent to the part region of the fixing means, whereby a particularly simple and economical production of the fixing means is possible.

It is also proposed that the transmission means substantially consists of plastic material. The term "substantially" in this context means in particular preferably a proportion of more than 50% and particularly preferably more than 70% of a volume of the transmission means. Thus the transmission means can lightweight design. Particularly preferably here elastomer plastic materials can be used.

If the carrier element is substantially covered towards the outside by the transmission means, the transmission means can advantageously be connected captively with the fixing means, whereby a simpler assembly can be achieved. The term "substantially" in this context in particular means more than 50%, in particular more than 70% of an outwardly directed surface of the carrier element.

In a preferred embodiment a friction connection can exist between the transmission means and the carrier element so that the transmission means can be held in position by the friction connection during assembly and the carrier element is movable by sliding relative to the transmission element by overcoming an adhesion and slip friction force of the friction connection.

BRIEF DESCRIPTION OF THE DRAWINGS

Further advantages arise from the following description of the drawings. The drawings show embodiment examples of the invention. The description and claims contain numerous features in combination. The person skilled in the art will also suitably consider the features individually and combine these into sensible further combinations.

DETAILED DESCRIPTION

Figure 1:
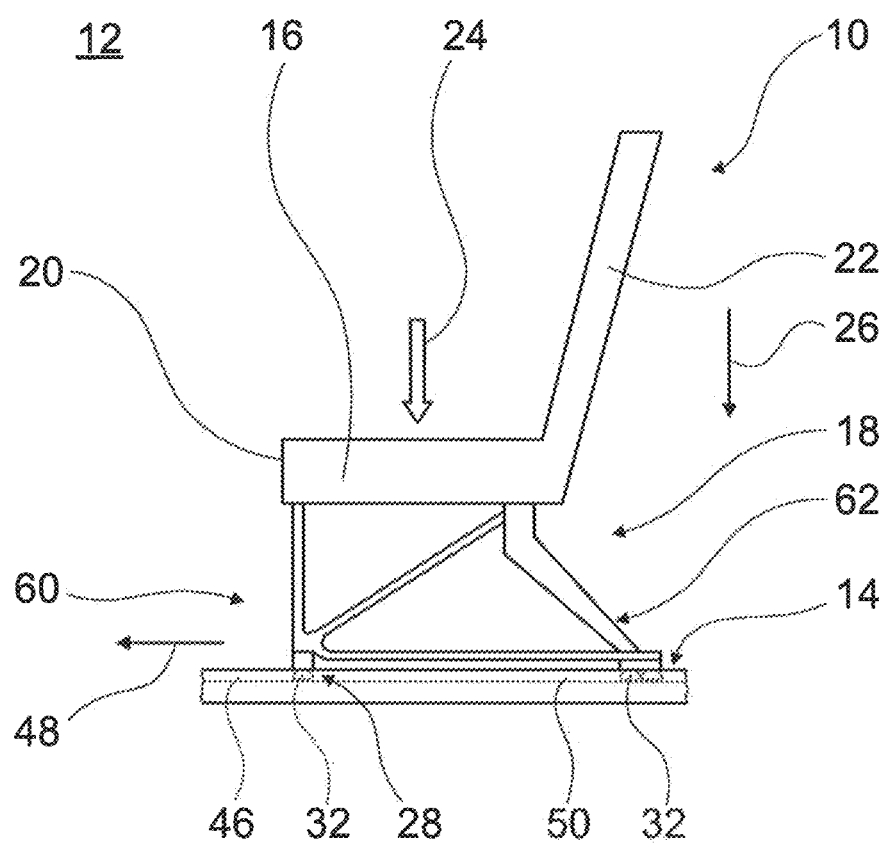
FIG. 1 is a diagrammatic depiction of a vehicle seat formed as an aircraft passenger seat in an installed state.

FIG. 1 shows in a side view a vehicle seat formed as an aircraft passenger seat 10 in an installed state in an interior 12 of the vehicle which is not shown in more detail and is formed as an aircraft. The interior of the aircraft comprises a vehicle structure 14 formed as a cabin floor and fixing rails 46 integrated in the cabin floor, of which only one fixing rail 46 is shown in the side view in FIG. 1.

The vehicle seat can be used in further embodiments but also in other mass transport means, such as for example in a railway carriage, a coach or a passenger ship.

The aircraft passenger seat 10 has a seat part 16 which forms a substantially horizontal seating surface and is supported on the vehicle structure 14 by means of a support unit 18. The support unit 18 has a front seat foot unit 60 which, in relation to a vertical direction oriented perpendicular to the cabin floor, is arranged below a front edge 20 formed by the seat part 16. The seat foot unit 60 is provided in a front region of the aircraft passenger seat 10 in order to support this. Furthermore the support unit 18 has a further seat foot unit 62 which, to support the aircraft passenger seat 10, is arranged in its rear area and below a backrest 22 of the aircraft passenger seat 10.

The aircraft passenger seat 10 comprises seat fixing devices which are each allocated to the seat foot units 60, 62 and are mounted thereon. The structure and function of the seat fixing devices are identical at all seat foot units 60, 62 and are explained below as an example with reference to a seat fixing device of one of the seat foot units 60, 62.

The seat fixing device has a fixing means 32 which is provided for coupling with the fixing rail 46. In the depiction in FIG. 1, the aircraft passenger seat 10 is shown in its state attached to the cabin floor, wherein the fixing means 32 is arranged in a longitudinal channel 50 recessed into the fixing rail 46 and extending in a direction 48 which runs parallel to a longitudinal direction of the aircraft.

Figure 2:
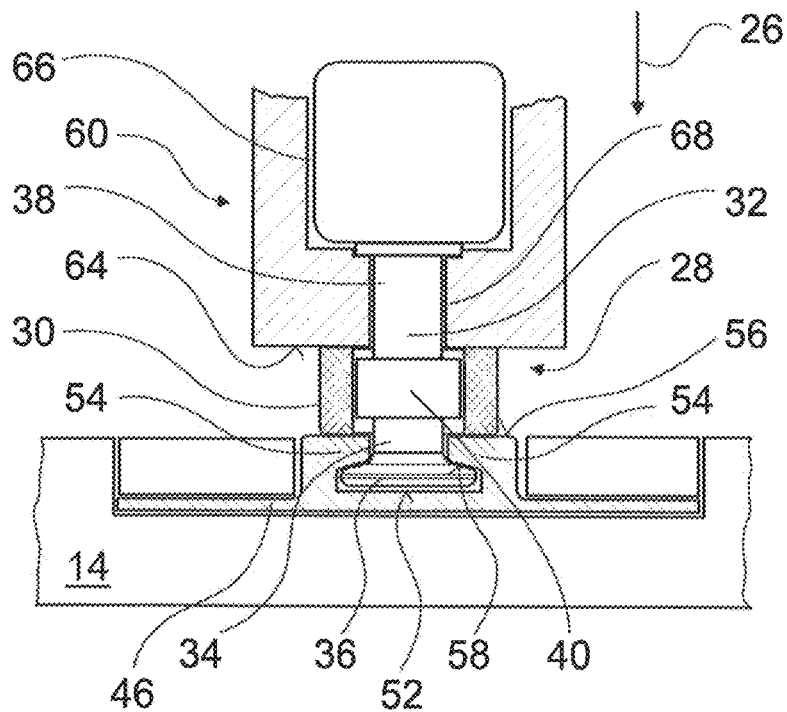
FIG. 2 is a detailed view of a seat foot unit of the aircraft passenger seat according to FIG. 1 in a front view, with a force transmission unit in a normal operating mode.

The fixing means 32 coupled with the fixing rail 46 is shown in more detail in the view in FIG. 2. This embodiment of a fixing rail 46 is known in the prior art and therefore described in detail here only insofar as necessary for depiction of the invention. The fixing rail 46, with a top 56 facing the seat foot unit 60, 62, terminates flush with the cabin floor of the interior 12 of the aircraft. The fixing rail 46 is formed by a hollow profile which delimits the longitudinal channel 50 at the profile top 56 with facing profile flanks 54 and at the bottom with a closed rail base 52. The longitudinal channel 50 in the known manner has at a predefined dimension passage openings (not shown) which have a constant spacing from each other and are designed in the manner of bores.

Figure 3:
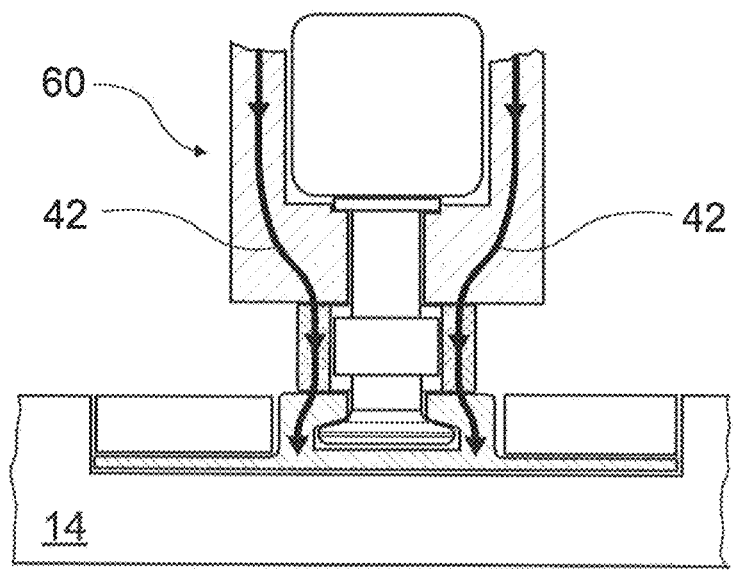
FIG. 3 is the detailed view according to FIG. 2 with a first force application path.

The seat fixing device comprises a first force transmission unit 28 which is intended to provide, in a normal operating mode, a first force application path of a weight and acceleration force 24 which is introduced into the vehicle structure 14 via the aircraft passenger seat 10 (FIG. 3).

The first force transmission unit 28 comprises an end 64 of the seat foot unit 60, 62 facing the cabin floor and a transmission means 30. The transmission means 30 is formed by an annular plastic body and substantially consists of polyoxymethylene (POM). In normal operating mode the weight and acceleration force 24 which is introduced into the vehicle structure 14 via the aircraft passenger seat 10 is transmitted via the end of the seat foot unit 60, 62 to the transmission means 30 and then from the transmission means 30 to the top 56 of the fixing rail 46 facing the seat foot unit 60, 62. Because of the material properties of the transmission means 30 described in the following sections, said means is intended to provoke by spring effect a damping of externally excited vibrations at the aircraft passenger seat 10 and to increase a seating comfort for a seat user.

The fixing means 32 of the seat fixing device is formed by a locking bolt which in the position located on the fixing rail 46 (FIGS. 2 and 3) is arranged with a main extension direction in the vertical direction 26 perpendicular to the cabin floor. At a lower end 34 facing the fixing rail 46, the fixing means 32 is formed as a disk element 36 which, in comparison with an upper region 38 facing away from the fixing rail 46, has a greater diameter in a direction transverse to the main extension direction of the fixing means 32.

The upper region 30 of the fixing means 32 is arranged in a receiver region 66 of the seat foot unit 60, 62 which is formed as a region recessed out of the seat foot unit 60, 62. In a state in which the seat fixing device is attached to the seat foot unit 60, 62, the locking bolt is passed through an opening 68 in a base surface of the seat foot unit 60, 62 facing the fixing rail 46.

Furthermore the fixing means 32 comprises a carrier element 40 which has a dimension, formed by a diameter in the direction transverse to the main extension direction of the fixing means 32, which is greater than dimensions, formed by diameters in this direction, of parts of the fixing means 32 which are arranged before or after the carrier element 40 in the main extension direction. The carrier element 40 in an entire outer periphery is in contact with the transmission means 30 and hence is substantially covered towards the outside by the transmission means 30. A friction connection exists between the transmission means 30 and the carrier element 40. The function of the carrier element 40 is described in the sections below.

The disk, element 36 of the fixing means 32 of the seat fixing device at the seat foot unit 60, 62 is subjected to spring force by a spring element (which is not shown for reasons of clarity) against the vertical direction 26 away from the rail base 52 of the fixing rail 46, and brought into contact with the lower inside faces 58 of the profile flanks 54 of the fixing rail 46, whereby in the known manner production tolerances of components are compensated which would otherwise lead to undesirable noise formation (anti-rattle device). The spring force is designed such that it is greater than the adhesion and slip friction force of the friction connection between the transmission means 30 and the carrier element 40, so that the carrier element 40 is movable sliding against the transmission means 30 in normal operating mode.

As shown by the depiction of the first force application path 42 in FIG. 2, the fixing means 32 in normal operating mode is not loaded by the weight and acceleration force 24 which is introduced into the vehicle structure 14 via the aircraft passenger seat 10.

When a predefined limit value is exceeded for the weight and acceleration force 24 which is transmitted by the aircraft passenger seat 10 on the first force application path 42 via the transmission means 30 and introduced into the vehicle structure 14, the seat fixing device is provided to change from normal operating mode to impact mode. In impact mode the transmission means 30 is provided to create a precondition for generating at least one second force application path 44 of the weight and acceleration force 24 which is introduced into the vehicle structure 14 via the aircraft passenger seat 10.

Figure 4:
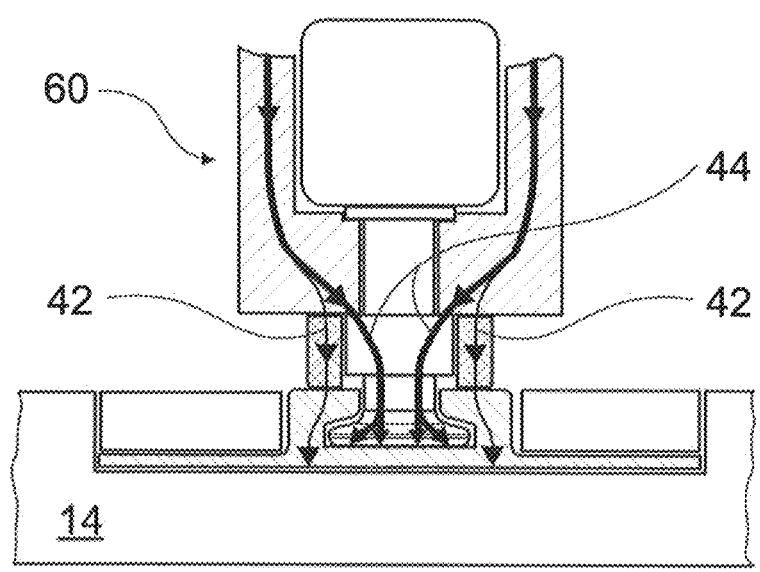
FIG. 4 is a detailed view of a seat foot unit of the aircraft passenger seat according to FIG. 1 in a front view, with the force transmission unit in an impact mode.

Because of the weight and acceleration force 24 which is transmitted in impact mode by the aircraft passenger seat 10 on the first force application path 42 via the transmission means 30 and introduced into the vehicle structure 14, the transmission means 30 undergoes namely a mechanical deformation which is of a substantially linear-elastic nature and is expressed in that a dimension of the transmission means 30 in the main extension direction of the fixing means 32 is reduced (FIG. 4).

The distance of the end 64 of the seat foot unit 60, 62 facing the cabin floor, from the top 56 of the fixing rail 46 facing the seat foot unit 60, 62, thus becomes smaller. On a further increase in the weight and acceleration force 24 transmitted by the aircraft passenger seat 10 on the first force application path 42 via the transmission means 30 and introduced into the vehicle structure 14, the end 64 of the seat foot unit 60, 62 facing the cabin floor comes ever closer to the carrier element 40 and finally comes into contact with this (FIG. 4). Because of its geometric design, the carrier element 40 is provided to be carried by the seat foot unit 60, 62 as an accelerated part of the vehicle seat on its movement in the direction of the top 56 of the fixing rail 46.

By this carrying movement, the fixing means 32 with the end 34 formed as a disk element 36 comes into contact with the rail base 52 of the fixing rail 46. In this arrangement, initiated by the mechanical deformation of the transmission means 30, a second force application path 44 is generated for the weight and acceleration force 24 which is introduced into the vehicle structure 14 via the vehicle seat. The second force application path 44 shown in FIG. 3 leads via the end 64 of the seat foot unit 60, 62 facing the cabin floor, the carrier element 40, a region of the fixing means 32 below the carrier element 40, and the end 34 of the fixing means 32 formed as a disk element 36, to the rail base 52 of the fixing rail 46.

The first force application path 42 and the second force application path 44 exist simultaneously in this arrangement. Because of a selected material property and a geometric design of the transmission means 30, a division is provided of the weight and acceleration force 24 which is introduced into the vehicle structure 14 via the aircraft passenger seat 10, which division, in impact mode, has a proportion of the weight and acceleration force 24, which is introduced into the vehicle structure 14, of 10% via the first force application path 42 and 90% via the second force application path 44. By this design, in impact mode in particular the load on the profile flanks 54 of the fixing rail 46 and the transmission means 30 is less than in an arrangement without carrier element 40, so only lower mechanical strength requirements need be imposed on these components, wherein nonetheless all safety requirements can be fulfilled with the lower mechanical strength.

The invention claimed is:

1. A seat fixing device for fixing a vehicle seat to at least one fixing rail attached to a vehicle structure of a vehicle which is an aircraft, with a fixing means which is provided for coupling with the at least one fixing rail, and with a force transmission unit which is in direct contact with the at least one fixing rail, and which comprises a transmission means which is intended to provide, in a normal operating mode, a first force application path of a weight and acceleration force which is introduced into the vehicle structure via the vehicle seat, wherein in the normal operating mode the fixing means is unladen by the weight and acceleration force which is introduced into the vehicle structure via the vehicle seat, wherein in the normal operating mode the weight and acceleration force, which is introduced into the vehicle structure via the vehicle seat, is transmitted via the first force application path which leads via the transmission means to a top of the at least one fixing rail, wherein in an impact mode the transmission means is intended to at least initiate a generation of at least one second force application path of the weight and acceleration force which is introduced into the vehicle structure via the vehicle seat, wherein the transmission means substantially consists of a plastic material, wherein in the impact mode the fixing means has at least one carrier element which is provided to be pushed and carried by an accelerated part of the vehicle seat, wherein the at least one second force application path leads via the at least one carrier element and an end of the fixing means to a rail base of the at least one fixing rail, and wherein the transmission means is compressible by application of the first force application path, wherein the transmission means that is compressed initiates the generation of the at least one second force application path to the rail base via the at least one carrier element, and wherein in the impact mode the end of the fixing means is adapted to come into contact with the rail base of the at least one fixing rail.

2. The seat fixing device as claimed in claim 1, wherein the transmission means initiates the generation of the at least one second force application path of the weight and acceleration force which is introduced into the vehicle structure via the vehicle seat, by mechanical deformation.

3. The seat fixing device as claimed in claim 1, wherein a mechanical deformation of the transmission means is of a substantially linear-elastic nature.

4. The seat fixing device as claimed in claim 1, wherein the at least one carrier element is substantially covered towards the outside by the transmission means.

5. A vehicle seat with a seat fixing device as claimed in claim 1.

6. The seat fixing device as claimed in claim 2, wherein the mechanical deformation of the transmission means is of a substantially linear-elastic nature.

7. The seat fixing device as claimed in claim 2, wherein the at least one carrier element is substantially covered towards the outside by the transmission means.

8. A vehicle seat with a seat fixing device as claimed in claim 2.

9. The seat fixing device as claimed in claim 3, wherein the at least one carrier element is substantially covered towards the outside by the transmission means.

10. A vehicle seat with a seat fixing device as claimed in claim 3.

11. The seat fixing device as claimed in claim 1, wherein a division is provided of the weight and acceleration force which is introduced into the vehicle structure via the vehicle seat, via the first force application path and the at least one second force application path, the division, in the impact mode, has a proportion of the weight and acceleration force, which is introduced into the vehicle structure, of 10% via the first force application path and 90% via the at least one second force application path.

12. A seat fixing device for fixing a vehicle seat to at least one fixing rail attached to a vehicle structure of a vehicle which is an aircraft, with a fixing means which is provided for coupling with the at least one fixing rail, and with a force transmission unit which is in direct contact with the at least one fixing rail, and which comprises a transmission means which in a normal operating mode is intended to provide a first force application path of a weight and acceleration force which is introduced into the vehicle structure via the vehicle seat, wherein in the normal operating mode the fixing means is unladen by the weight and acceleration force which is introduced into the vehicle structure via the vehicle seat, wherein in the normal operating mode the weight and acceleration force, which is introduced into the vehicle structure via the vehicle seat, is transmitted via the first force application path which leads via the transmission means to a top of the at least one fixing rail, wherein in an impact mode the transmission means is intended to at least initiate a generation of at least one second force application path of the weight and acceleration force which is introduced into the vehicle structure via the vehicle seat, wherein the transmission means substantially consists of a plastic material, wherein the fixing means has at least one carrier element which in the impact mode is provided to be pushed and carried by an accelerated part of the vehicle seat, wherein the at least one second force application path leads via the at least one carrier element and an end of the fixing means to a rail base of the at least one fixing rail, wherein the transmission means is formed by an annular body, wherein the outer periphery of the at least one carrier element is substantially covered towards an outer periphery thereof by the transmission means, and wherein the at least one carrier element and the transmission means are in frictional connection, and wherein in the impact mode the end of the fixing means is provided to come into contact with the rail base of the at least one fixing rail.

13. The seat fixing device as claimed in claim 1, wherein the vehicle seat has a seat foot unit, wherein the aircraft has a cabin floor, wherein, in the normal operating mode, an end of the seat foot unit facing the cabin floor is spaced apart from the at least one carrier element and wherein, in the impact mode, the end of the seat foot unit is adapted to come into contact with the at least one carrier element.

14. The seat fixing device as claimed in claim 1, wherein the at least one fixing rail has profile flanks, wherein, in the normal operating mode, a load on the profile flanks of the at least one fixing rail is greater than a load directly on the rail base and wherein, in the impact mode, the load directly on the rail base is greater than the load on the profile flanks.

15. The seat fixing device as claimed in claim 1, wherein, in the normal operating mode, a load on the transmission means is greater than a load directly on the rail base and wherein, in the impact mode, the load directly on the rail base is greater than the load on the transmission means.

* * * * *